(12) United States Patent  (10) Patent No.: US 8,216,101 B2
Numajiri  (45) Date of Patent: Jul. 10, 2012

(54) DRIVING FORCE TRANSMISSION APPARATUS AND ADJUSTMENT METHOD THEREOF

(75) Inventor: Tomohiro Numajiri, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/027,632

(22) Filed: Feb. 15, 2011

(65) Prior Publication Data

US 2011/0269586 A1    Nov. 3, 2011

Related U.S. Application Data

(63) Continuation of application No. PCT/JP2010/057620, filed on Apr. 28, 2010.

(51) Int. Cl.
    *F16H 7/12*    (2006.01)
(52) U.S. Cl. ............................................. 474/138
(58) Field of Classification Search .................. 474/138, 474/117, 136, 137, 133, 134, 135, 118, 139, 474/113, 101
    See application file for complete search history.

(56) References Cited

U.S. PATENT DOCUMENTS

| | | | |
|---|---|---|---|
| 1,308,570 A | | 7/1919 | Zanes |
| 4,151,756 A | * | 5/1979 | Binder et al. .................. 474/138 |
| 4,425,103 A | * | 1/1984 | Foster ............................ 474/138 |
| 4,458,403 A | * | 7/1984 | Foster ............................ 29/434 |
| 4,466,803 A | * | 8/1984 | Wilson ........................... 474/138 |
| 4,500,304 A | * | 2/1985 | Foster ............................ 474/138 |
| 4,838,101 A | * | 6/1989 | Dobberpuhl et al. ........ 74/15.63 |
| 5,967,923 A | * | 10/1999 | Petri ............................... 474/138 |
| 2003/0109343 A1 | | 6/2003 | Martinson et al. |
| 2006/0217223 A1 | * | 9/2006 | Schmid et al. ................ 474/136 |

FOREIGN PATENT DOCUMENTS

| | | |
|---|---|---|
| JP | U-S59-158749 | 10/1984 |
| JP | U-H03-067742 | 7/1991 |
| JP | U-H03-108951 | 11/1991 |
| JP | 3297808 | 7/2002 |
| JP | 3666899 | 6/2005 |

* cited by examiner

*Primary Examiner* — Emmanuel M Marcelo
*Assistant Examiner* — Juan Campos, Jr.
(74) *Attorney, Agent, or Firm* — Manabu Kanesaka; Kenneth M. Berner; Benjamin J. Hauptman

(57) ABSTRACT

A driving force transmission apparatus includes: a motion power transmission part for transmitting a motion power via a driving medium formed by a belt or a chain; and a tensioner for applying a tension to the driving medium. The tensioner includes: a compression spring for biasing the driving medium; a stopper for preventing the compression spring from being compressed to a length less than a predetermined length; and an adjustment part for pushing the compression spring to be the predetermined length in a direction toward the driving medium. According to this configuration, the tension of the driving medium is dominant at installation. When the driving medium becomes fatigue to some extent, the stopper of the tensioner becomes off and the compression spring absorbs the vibration of the driving medium. As a result, the exchange timing of the tensioner can be extended by a simple configuration.

7 Claims, 5 Drawing Sheets

DRIVING FORCE TRANSMISSION APPARATUS AND ADJUSTMENT METHOD THEREOF

CROSS-REFERENCE TO RELATED APPLICATION

This application is a continuation of International Application No. PCT/JP2010/057620, filed on Apr. 28, 2010.

TECHNICAL FIELD

The present invention relates to a driving force transmission apparatus and an adjustment method thereof.

BACKGROUND ART

A technique for transmitting rotations of a certain driving shaft to another driving shaft via a driving medium such as a belt and a chain is employed. In such a driving force transmission apparatus, a tensioner is used to set the tension of driving medium to be an appropriate level. The tensioner adjusts the tension of the driving medium to be appropriate by biasing the driving medium with a biasing member, for example, a compression spring.

As reference techniques of the tensioner, the following patent literatures 1 and 2 are cited.

CITATION LIST

Patent literature 1: Japanese Patent Publication No. 3297808
Patent literature 2: Japanese Patent Publication No. 3666899

SUMMARY OF INVENTION

When a driving force transmission apparatus is used, a driving medium such as a belt and a chain rotates, and then the rotations of a certain drive shaft are transmitted to another drive shaft. In the meantime, the tensioner receives a varying stress from the driving medium to be fatigued. Accordingly, in a case of using the driving force transmission apparatus for a long period, maintenance works of the tensioner such as replacement of a biasing member is required.

A driving force transmission apparatus and an adjustment method thereof requiring less effort to the maintenance works of the tensioner are required. In particular, a driving force transmission apparatus and an adjustment method thereof which are able to reduce the effort of maintenance works of the tensioner with simple means are required.

In an aspect of the present invention, a driving force transmission apparatus includes: a motion power transmission part configured to transmit a motion power via a driving medium formed by a belt or a chain; and a tensioner configured to apply a tension to the driving medium. The tensioner includes: a compression spring configured to bias the driving medium; a stopper configured to prevent the compression spring from being compressed to a length less than a predetermined length; and an adjustment part configured to be able to push the compression spring to be the predetermined length in a direction toward the driving medium.

According to an aspect of the present invention, an adjustment method of a driving force transmission apparatus according to the present invention is provided. The adjustment method includes: compressing the compression spring to be the predetermined length by applying a force in a direction toward the driving medium by the adjustment part when the tensioner is adjusted.

According to the present invention, a driving force transmission apparatus and an adjustment method thereof requiring less effort to a maintenance work of the tensioner are provided. In particular, a driving force transmission apparatus and an adjustment method thereof which are able to reduce the effort of maintenance work of the tensioner with simple means are provided.

BRIEF DESCRIPTION OF DRAWINGS

The above-mentioned object, other objects, effects, and features of the present invention are more clarified form the description of embodiment in cooperation with the accompanying drawings, in which.

DESCRIPTION OF EMBODIMENTS

Figure 1:
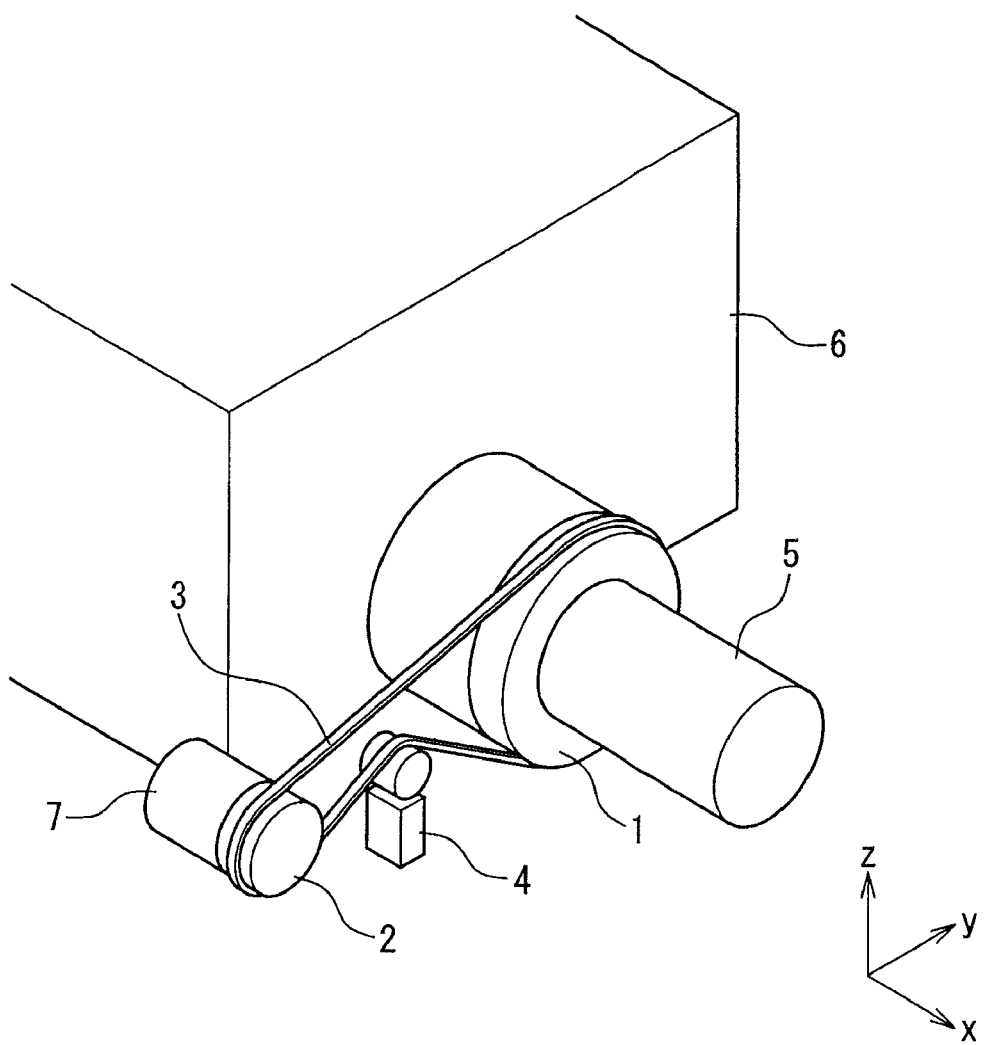
FIG. 1 is a perspective view of a driving force transmission apparatus.

Referring to drawings, embodiments of the present invention will be explained below. FIG. 1 shows a driving force transmission apparatus. The driving force transmission apparatus has a motion power transmission part including: a pulley 1 connected to a certain rotation axis; a pulley 2 connected to another rotation axis; and a loop belt 3 wrapped around them. In stead of the belt 3 and the pulleys 1 and 2, a driving medium such as a roller chain with a sprocket may be used. The pulley 1 is connected to a coupling 5 and a generator 6. The coupling 5 is coupled to a shaft for transmitting torque generated by a motor and the like. The torque of the coupling 5 rotates the pulley 1 and is transmitted to a main generator 6. The main generator 6 converts the torque into electric power and supplies the power outside.

The torque of the pulley 1 is transmitted to the pulley 2 via the belt 3. The pulley 2 supplies the torque to a certain apparatus. In the present embodiment, the pulley 2 supplies the torque to the generator 7. The generator 7 converts the torque into the electric power and supplied the power to an apparatus not shown in the drawing. The driving force transmission apparatus has a tensioner 4. The tensioner 4 applies tension to a driving medium. Specifically, the tensioner 4 adjusts the tension of the belt to be within an appropriate range by biasing the belt 3 with a spring.

Figure 2:
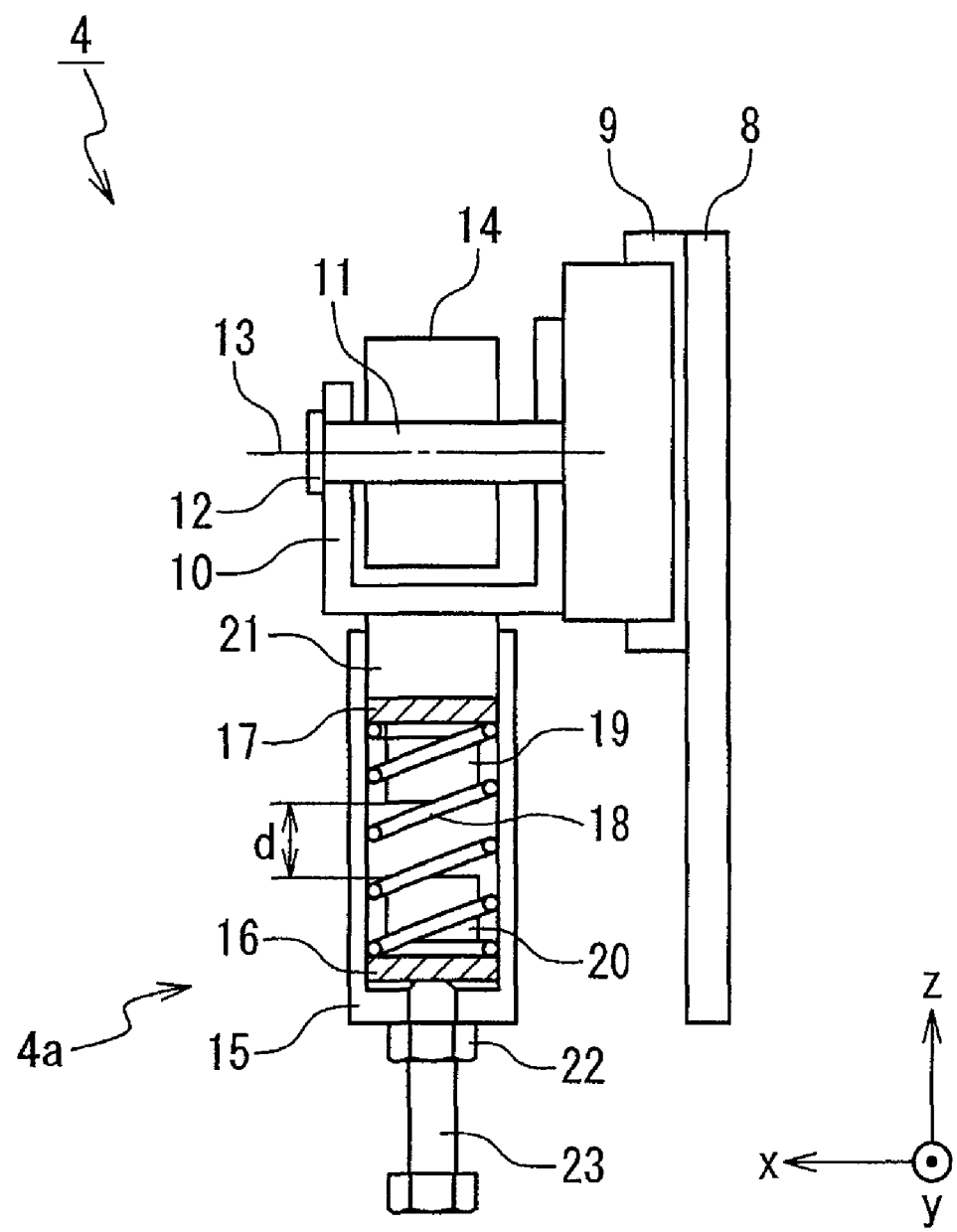
FIG. 2 is a cross sectional view of a tensioner.

FIG. 2 is a cross section view of the tensioner 4. The tensioner 4 has an attachment plate 10. A pin 11 is attached to the attachment plate 10 by using a pin-retaining plate 12. A pulley 14 is preliminarily attached to the pin 11. The pulley 14 is a member to be pressed to bias the belt 3. The pulley 14 is attached rotatably to the attachment plate 10 around a rotation axis 13 that is a center of the pin 11. The pulley 14 freely rotates in accordance with the driving of the belt 3. A bracket 8 is fixed to a support member for supporting the driving force transmission apparatus. A guide 9 is attached to the attachment plate 10 so that the plate can move in a predetermined direction (the x axis direction) with respect to the bracket 8. The predetermined direction is a direction where the pulley 14 pushes the belt 3 to influence its tension (hereinafter referred to as a biasing direction).

The tensioner 4b has a biasing part 4a. The biasing part 4a has a retainer 15 that is a cylindrical member. The retainer 15 is fixed to the support member in the same manner as that of the bracket 8. The retainer 15 has a cylindrical space for storing a spring 18 inside. In the present embodiment, the spring 18 is a compression coil spring. One end of the spring 18 is held by a spring hold member 16 that is a first member, and the other end is held by a spring hold member 17 that is a second member. The spring hold members 16 and 17 are sliding members that are supported on an internal wall surface of the retainer 15 and slide in the biasing direction.

The position of the spring hold member 16 in the biasing direction is adjusted by an adjustment part including a nut 22 and a bolt 23. In the adjustment of the tensioner 4, an operator compresses the spring 18 so as to be a predetermined length by applying force to the spring 18 by the bolt 23 in a direction toward the belt 3.

A through-hole penetrating in an extension direction of the spring 18 is provided on a bottom surface of the retainer 15. An internal thread screwed with an external thread of the bolt 23 is formed inside the through-hole. The position of the bolt 23 in the extension direction of the spring 18 is set at a desired position by rotating the bolt 23. The nut 22 for preventing the loosing by being screwed with the bolt 23 is arranged outside a bottom surface of the retainer 15. A tip of the bolt 23 contacts to a side of the spring hold member 16 opposite to the spring 18. The position of the end portion of the spring 18 on the side of the spring hold member 16 is changed by adjusting the position of the bolt 23 in the biasing direction, and thus the length of the spring 18 can be adjusted. That is, the bolt 23 serves as a jack-up bolt for adjusting the position of the lower end side of the spring 18.

The side of the spring hold member 17 opposite to the side facing to the spring 18 contacts to one end of a stop plate 21. The other end of the stop plate 21 contacts to one end of the attachment plate 10. By applying an elastic force of the spring 18 in the biasing direction via the stop plate 21 and the pulley 14, the tension of the belt 3 is adjusted.

The spring hold member 17 has an insertion piece 19 which is formed on a side of the spring hold member 17 facing to the spring 18 and is a cylindrical projection whose generatrix direction is the extension direction of the spring. In the same manner, the spring hold member 16 has an insertion piece 20 which is formed on a side of the spring hold member 16 facing to the spring 18 and is a cylindrical projection whose generatrix direction is the extension direction of the spring. The insertion pieces 19 and 20 serve as stoppers for preventing the spring 18 from being compressed to be shorter than a predetermined length. In order to reduce the size of the retainer 15, it is desired that the insertion pieces 19 and 20 are arranged inside the cylindrical shape of the spring 18 as shown in the drawings. The insertion pieces 19 and 20 may be formed on only one of the spring hold members 16 and 17. In that case, the insertion piece 19 or 20 is formed so as to be longer in the generatrix direction than the length of the spring 18 at the maximum compression.

Figure 3:
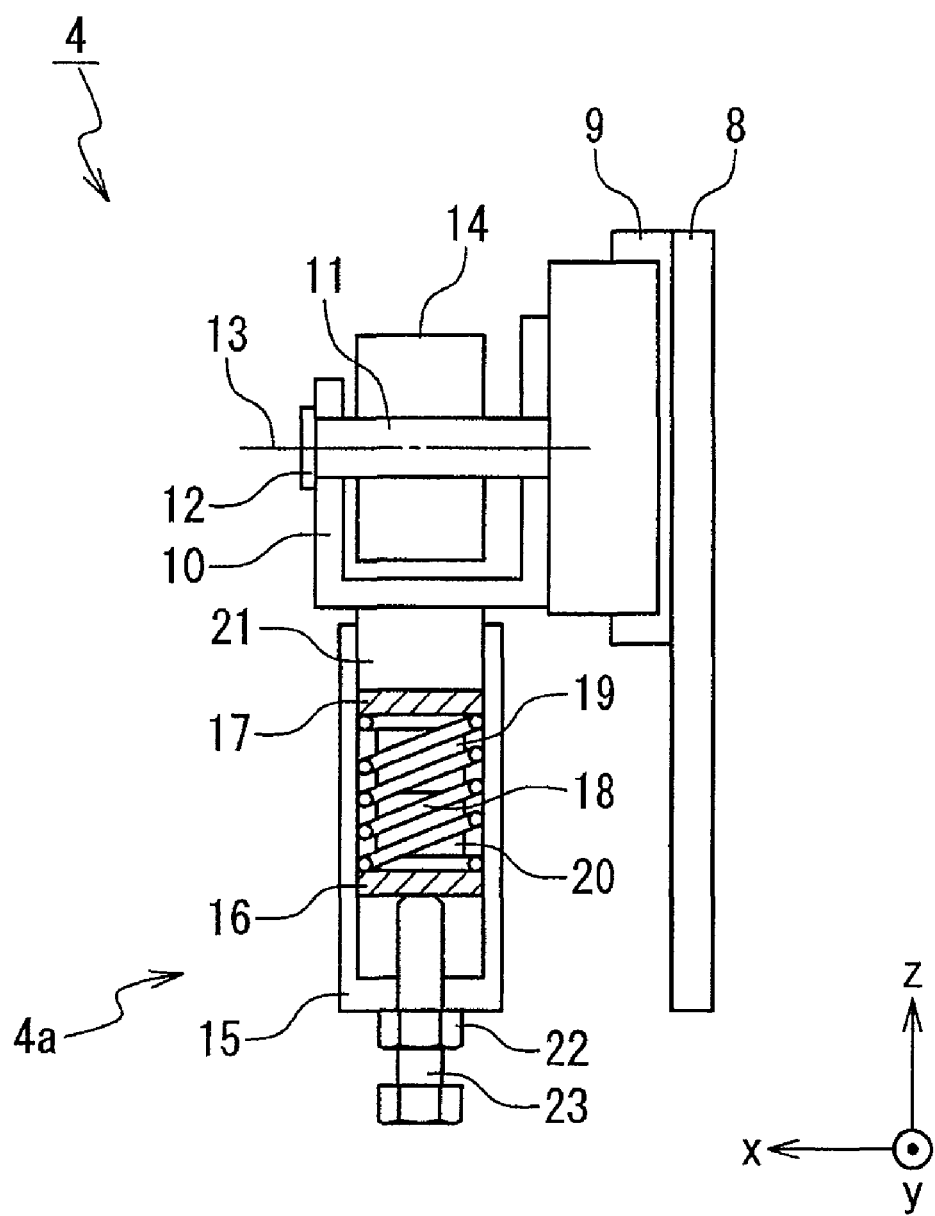
FIG. 3 is a cross sectional view of the tensioner.

In FIG. 2, there is a clearance of distance d in the biasing direction between the insertion piece 19 and the insertion piece 20. In this state, the spring 18 can be compressed only by the distance d. When the spring 18 is compressed by the distance d from FIG. 2, the insertion piece 19 and the insertion piece 20 are abutted to each other as shown in FIG. 3, and the contact surfaces support the compression force. In this state, the spring 18 itself is not bottoming. That is, the spring 18 is compressed in a state where the wires adjoining in the biasing direction of the spring 18 do not contact to each other. However, when the insertion pieces 19 and 20 contact to each other the biasing part 4a will be in a bottoming state.

Figure 4:
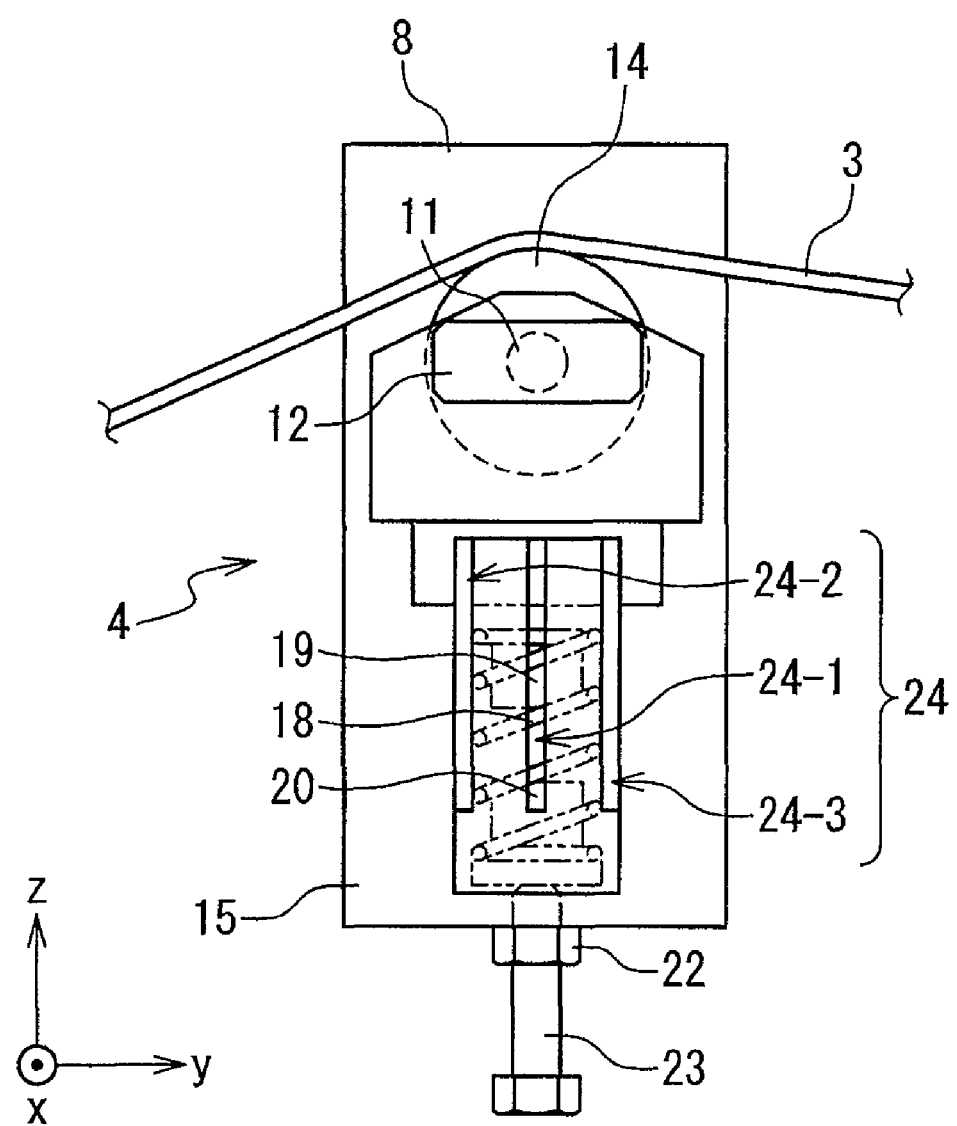
FIG. 4 is a side view of a part of a belt and the tensioner.

FIG. 4 shows a side surface of: a part of the belt 3; and the tensioner 4. The retainer 15 has monitor windows (monitor windows 24-1 to 24-3). Each monitor window 24 is a window elongated in the biasing direction. The operator can visually recognize the spring 18 and insertion pieces 19 and 20 in an inside of the retainer 15 through each monitor window 24 from outside. In particular, an end portion of the insertion piece 19 nearer to the belt 3 and an end portion of the insertion piece 20 facing the former end portion can be visually recognized. In the case where only one of the insertion pieces 19 and 20 is provided, the monitor windows 24 are provided so that the mutually-facing end portions of: one of the insertion pieces 19; and the spring hold member 16 or 17 facing the piece can be visually recognized from an outside of the retainer 15. That is, the monitor window 24 is formed to visually recognize: the end portion of at least one of the insertion pieces; and the end portion of another member facing the former end portion. The number of the monitor window 24 may be one; however, there may be a case where it is difficult to visually recognize the state of the spring 18 and the insertion pieces 19 and 20 because the wire of the spring 18 is an obstacle depending on design. For this reason, as show in FIG. 4, it is preferable to provide a plurality of the monitor windows 24-1 to 24-3 at different positions in a circumferential direction of the retainer 15.

Figure 5:
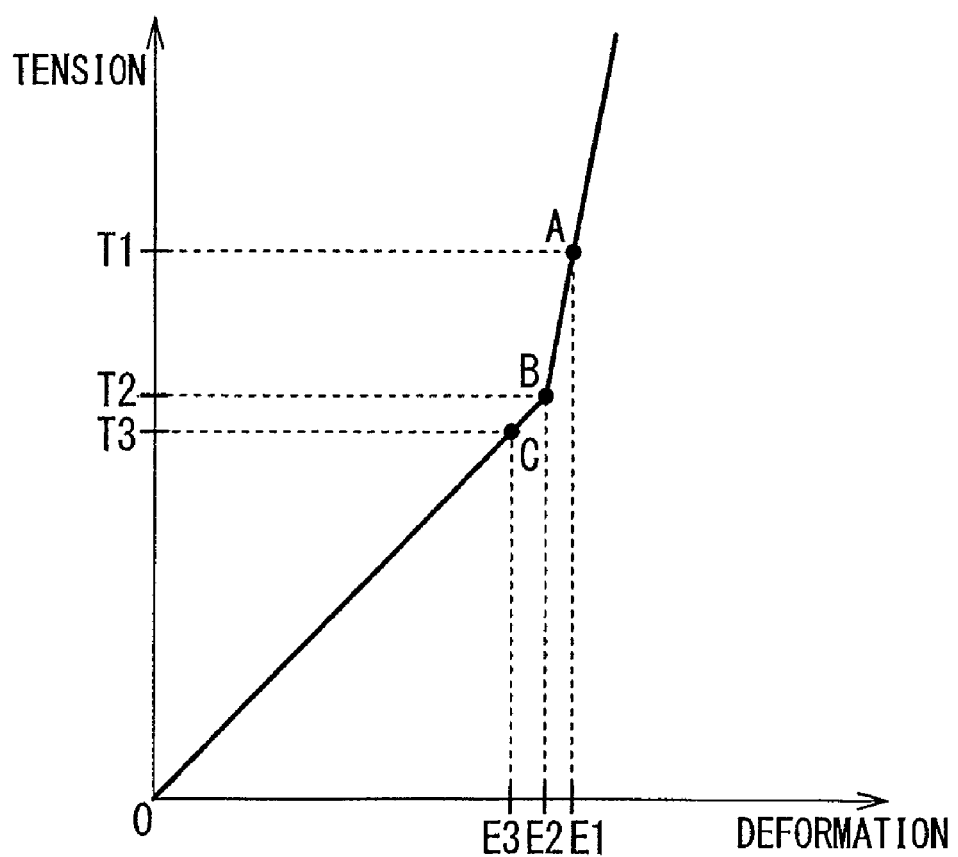
FIG. 5 shows a relationship between the extension of an elastic member and the tension.

Referring to FIG. 5, an adjustment method of the driving force transmission apparatus will be explained. The horizontal axis in FIG. 5 shows a permanent deformation of the elastic members of the driving force transmission apparatus, that is, extension caused by fatigue of the belt 3 and compression caused by fatigue of the spring 18. Namely, it shows the difference between the length of the belt 3 and the spring 18 installed in the driving force transmission apparatus and the length of the belt 3 and the spring 18 in a state where any force is not applied. The vertical axis in FIG. 5 shows the tension applied to the elastic members.

In the driving force transmission apparatus according to the present embodiment, the adjustment of the tension of the belt 3 that is the driving medium is carried out by using both of the tension of the belt 3 itself and the tension applied by the tensioner 4. T1 in FIG. 5 shows an upper limit value within a range where the tension of the elastic member is appropriate. T3 shows a lower limit value within the range where the tension of the elastic member is appropriate.

The driving force transmission apparatus is firstly adjusted so that the tension of the belt 3 becomes T1. The deformation of the elastic members is E1 at this time. In this state, the tensioner 4 is adjusted by the bolt 23 so that the insertion piece 19 and the insertion piece 20 can contact to each other as shown in FIG. 3. When installed, the driving force transmission apparatus is adjusted so that the tensioner 4 becomes a rigid member with respect to the force in the compression direction in this manner.

Since the insertion pieces 19 and 20 are provided, the tensioner 4 can be a rigid member without compressing the spring to be in the state where the wires of the spring 18 contact to each other. To prevent fatigue, damage and permanent deformation of the spring 18, this is preferable.

When the driving force transmission apparatus is used, the belt 3 is fatigued in a long period to deteriorate the tension, and the state shifts from point A to point B. In the region between these points, spring constant of the belt 3 shown by the slope of the line in FIG. 5 is dominant. In this region, a load applied from the belt 3 to the tensioner 4 is supported by the contact surfaces of the insertion piece 19 and the insertion piece 20. Therefore, a variable load is hardly applied to the spring 18. Accordingly, in the period when the apparatus is used in the region between point A and point B, the fatigue of the spring 18 can be avoided.

In order to further reduce the fatigue of the spring 18, a damper may be provided in parallel. However, according to the above-mentioned reason, also in a case where a damper is not provided to the tensioner 4 in parallel, the fatigue of the spring 18 can be reduced in the adjustment method according to the present embodiment. Accordingly, a long-life tensioner 4 can be realized in a simple configuration. Moreover, a configuration for coping with oil leaks in the case where an oil damper is employed is not required.

When the belt 3 is slightly extended and thus the tension is reduced to reach the point B, the insertion piece 19 and the insertion piece 20 are separated to each other due to the tension of the spring 18 as the result that the force of the belt applied to the tensioner 4 is reduced. After that, in the region between point B and point C of the tension, the spring constant of the spring 18 shown by the slope of the line in FIG. 5 is dominant. In this region, the variation of the load applied from the belt 3 to the tensioner 4 is suppressed by the expansion and compression of the spring 18.

When the spring 18 is fatigued due to a prolonged use, the state shifts from the point B to the point C, and thus the tension reduces to T3. The operator preliminarily checks the distance d of the clearance shown in FIG. 2 between the insertion pieces at the time when the tension has reduced to T3. By monitoring the distance d between the insertion pieces from the monitor windows 24-1 to 24-3, the operator can recognize the tension has reduced to T3. When the distance d becomes a predetermined length or more, it is determined that the tension has fallen below an appropriate range, and accordingly the belt 3 and the tensioner 4 are replaced.

In this manner, by using the tension of the belt 3 itself and the tension of the spring 18 to maintain the tension of the belt 3 of the driving force transmission apparatus in an appropriate range, the period from the time of installation (point A) to the time of replacement of the tensioner 4 or the belt 3 (point C) can be extended. As a result, the driving force transmission apparatus requiring less effort to the maintenance can be realized by the tensioner having a simple configuration.

Moreover, the following effect can be obtained by using the tensions of the belt 3 and the spring 18. Generally, the spring constant of the belt 3 is often larger than the spring constant of the spring 18. This relationship is shown in that the slope in the region between point A and point B where the spring constant of the belt 3 is dominant in FIG. 5 is larger than the slope in the region between point B and point C where the spring constant of the spring 18 is dominant. When it is tried to set the tension of the belt 3 within an appropriate range without depending on the tensioner 4, the spring constant of the belt 3 is large, and thus the adjustment range of the extension shown in the horizontal axis becomes narrower and the adjustment becomes difficult. When the tension of the belt 3 is used in combination with the spring 18 having the spring constant larger than that of the belt 3, it becomes easy to adjust the tension of the belt 3 to be within an appropriate range.

Referring to embodiments, the present invention has been explained above; however, the present invention is not limited to the above-mentioned embodiments. Various modifications can be employed for the above-mentioned embodiments.

What is claimed is:

1. A driving force transmission apparatus comprising:
    a motion power transmission part configured to transmit a motion power via a driving medium formed by a belt or a chain;
    a tensioner configured to apply a tension to the driving medium, the tensioner comprising:
    a compression spring configured to bias the driving medium;
    a stopper configured to prevent the compression spring from being compressed to less than a predetermined length, wherein the predetermined length is greater than a length of the compression spring at which coils of the compression spring contact each other; and
    an adjustment part configured to be able to push the compression spring in a direction toward the driving medium to the predetermined length when the tensioner is adjusted, a sliding member configured to support an edge of the compression spring, the sliding member being disposed opposite to the driving medium in the cylinder, and slidably supported by an internal surface of the cylinder, and wherein the sliding member comprises an insertion piece arranged inside the compression spring; and the stopper is configured to prevent the compression spring from being compressed to a length shorter than the predetermined length by abutment with the insertion piece.

2. The driving force transmission apparatus according to claim 1, wherein the tensioner further comprises:
    a cylinder in which the compression spring is stored.

3. The driving force transmission apparatus according to claim 2, wherein a window is formed in the cylinder through which an edge of the insertion piece and an edge of another member which is disposed opposite the insertion piece, are visible from outside the cylinder.

4. The driving force transmission apparatus according to claim 2, wherein the stopper is disposed inside the compression spring and oriented directly toward and axially aligned with the insertion piece and sized to abut the insertion piece when the compression spring has been compressed to the predetermined length.

5. The driving force transmission apparatus according to claim 2, wherein when the stopper abuts against the insertion piece, the tensioner becomes rigid and incompressible.

6. An adjustment method of a driving force transmission apparatus, wherein the driving force transmission apparatus comprises:
    a motion power transmission part configured to transmit a motion power via a driving medium formed by a belt or a chain;
    a tensioner configured to apply a tension to the driving medium, the tensioner comprising:
    a compression spring configured to bias the driving medium;
    a stopper configured to prevent the compression spring from being compressed to less than a predetermined length, wherein the predetermined length is greater than a length of the compression spring at which coils of the compression spring contact each other; and
    an adjustment part configured to be able to push the compression spring in a direction toward the driving medium to the predetermined length when the tensioner is adjusted, a sliding member configured to support an edge of the compression spring, the sliding member being disposed opposite to the driving medium in the cylinder, and slidably supported by an internal surface of the cylinder, and wherein the sliding member comprises an insertion piece arranged inside the compression spring; and the stopper is configured to prevent the compression spring from being compressed to a length shorter than the predetermined length by abutment with the insertion piece,
    wherein the adjustment method comprises:

compressing the compression spring to the predetermined length by applying a force in a direction toward the driving medium by the adjustment part when the tensioner is adjusted.

7. The adjustment method of a driving force transmission apparatus according to claim 6, wherein the tensioner further comprises:
 a cylinder in which the compression spring is stored; and
 a sliding member configured to support an edge of the compression spring, the sliding member being disposed opposite to the driving medium in the cylinder, and slidably supported by an internal surface of the cylinder, and wherein
 the sliding member comprises an insertion piece arranged inside the compression spring; and
 the stopper is configured to prevent the compression spring from being compressed to a length shorter than the predetermined length by abutment with the insertion piece, and
 a window is formed on the cylinder through which an edge of the insertion piece and an edge of the stopper are visibly observed from outside the cylinder, and
the adjustment method further comprises:
checking a clearance between the edge of the insertion piece and the edge of the stopper and determining need to change the driving medium when the clearance becomes a predetermined length or more.

\* \* \* \* \*